United States Patent [19]
Walker

[11] 4,071,812
[45] Jan. 31, 1978

[54] AC INVERTER WITH CONSTANT POWER OUTPUT

[75] Inventor: Loren H. Walker, Schenectady, N.Y.

[73] Assignee: General Electric Company, Schenectady, N.Y.

[21] Appl. No.: 662,653

[22] Filed: Mar. 1, 1976

[51] Int. Cl.$^2$ ............................................. H02M 7/00
[52] U.S. Cl. ........................................ 363/80; 363/17; 363/132
[58] Field of Search ........................ 321/18, 19, 45, 12

[56] References Cited
U.S. PATENT DOCUMENTS

| | | | |
|---|---|---|---|
| 3,118,105 | 1/1964 | Relation et al. | 321/45 R |
| 3,303,408 | 2/1967 | Prines | 321/45 R |
| 3,406,327 | 10/1968 | Mapham et al. | 321/45 |
| 3,679,962 | 7/1972 | Wanlass | 321/2 X |
| 3,679,991 | 7/1972 | Wilwerding | 321/2 |
| 3,781,638 | 12/1973 | Anderson et al. | 321/2 X |
| 3,805,141 | 4/1974 | Pompa, Jr. et al. | 321/45 C X |
| 3,882,370 | 5/1975 | McMurray | 321/45 R |

*Primary Examiner*—William M. Shoop
*Attorney, Agent, or Firm*—Lawrence D. Cutter; Joseph T. Cohen; Jerome C. Squillaro

[57] ABSTRACT

A constant voltage square wave inverter drives a load connected as the damping element in an otherwise high Q, resonant matching circuit. The frequency of the inverter is maintained near the resonant frequency of the load circuit to provide substantially constant load power.

The frequency of the inverter operation may be maintained near load circuit resonance by forcing commutation of the square wave output voltage as the rate of change of load current is substantially zero. The inverter output voltage may also be commutated as the peak current reaches a predetermined reference value to stabilize inverter operation for loads which cannot accept real power.

29 Claims, 9 Drawing Figures

AC INVERTER WITH CONSTANT POWER OUTPUT

Portions of the inventions disclosed herein are the subject of claims in my concurrently filed U.S. patent application, Ser. No. 662,524.

BACKGROUND OF THE INVENTION

This invention relates to inverter circuits for producing an alternating current output which is regulated to a constant power level as a load impedance changes.

Inverter circuits are commonly used to produce alternating current power from a direct current source and to effect changes in the voltage level of an alternating or direct current source. It has been common practice to incorporate circuits in inverters which act to regulate and maintain the output current and/or the output voltage of the inverter at a constant value.

It is, in some instances, desirable to utilize an inverter circuit which will supply a constant power level to a load despite changes in the load impedance. Inverters with constant power output are useful, for example, for driving gas discharge lamps in which impedance characteristics vary. A constant power output is also desirable for charging of energy storage capacitors of the type commonly utilized in photoflash and pulse modulator equipment and for operating variable speed motors at constant power levels.

U.S. Pat. No. 3,781,638 by Thomas E. Anderson and John P. Walden describes a class of alternating current inverter circuits wherein commutation of an output voltage is initiated as load current reaches a predetermined, reference level. Inverters of this class will, therefore, function to regulate and maintain the power input to a load of constant impedance despite changes in the inverter input voltage. The above-mentioned patent disclosure is incorporated herein by reference.

The operation of gas discharge lamps with frequency controlled inverters and resonant matching networks is more particularly described in concurrently filed patent applications Ser. No. 662,529 by William P. Kornrumpf et al and Ser. No. 662,523 by Thomas A. Anderson, which are assigned to the assignee of this invention and incorporated herein by reference. In accordance with those disclosures, a gas discharge lamp is connected as a damping element across the capacitor of an otherwise high Q series resonant circuit. Prior to ignition the lamp presents a very high impedance and the Q of the resonant circuit remains high. The circuit is automatically driven at its resonant frequency during this period. Voltage buildup in the high Q circuit provides high voltage necessary for lamp starting. After ignition, the lamp impedance decreases greatly loading the resonant circuit and lowering its Q. At such times the inductor acts to limit current flow through the negative lamp impedance.

SUMMARY OF THE INVENTION

A load, which may have a varying impedance, is connected as the damping element in a high Q, resonant output circuit. The output circuit is driven from an AC source of substantially constant voltage at a variable frequency near its damped resonant frequency. Constant power can, thereby, be delivered to a wide range of load impedances. In a preferred embodiment, the AC source produces a wave which is commutated at such times as either (1) the instantaneous load current equals a predetermined reference level or (2) the time derivative of the load current, $dI/dt$, is at or near zero. In the "current derivative control" mode, the inverter switches polarity at each peak of the resonant current wave and is, therefore, locked near, but not precisely at, the resonant frequency of the output circuit. The peak current control mode acts to define circuit operation at such times as the load cannot accept real power, i.e., for short circuit or open circuit loads.

Inverter circuits of the present invention may be utilized for charging energy storage capacitors in which case charging is accomplished in approximately one-half of the time which is required to charge a capacitor from a current source of equal power rating.

The operating frequency of inverters of the present invention may be made to increase with increasing load impedance making such inverters highly compatible with magnetic elements having a constant volt-second characteristic.

It is, therefore, an object of this invention to provide an inverter circuit having a regulated, constant power output.

Another object of this invention is to provide a constant power circuit for the rapid and efficient charging of capactive elements.

Another object of this invention is to provide a constant power source having an operating frequency which increases as load impedance increases.

BRIEF DESCRIPTION OF THE DRAWINGS

The novel features of the present invention are set forth in the appended claims. The invention itself, together with advantages thereof, may best be understood by reference to the following detail description of preferred embodiments, taken in connection with the attached drawings in which:

DESCRIPTION OF THE PREFERRED EMBODIMENTS

Figure 1:
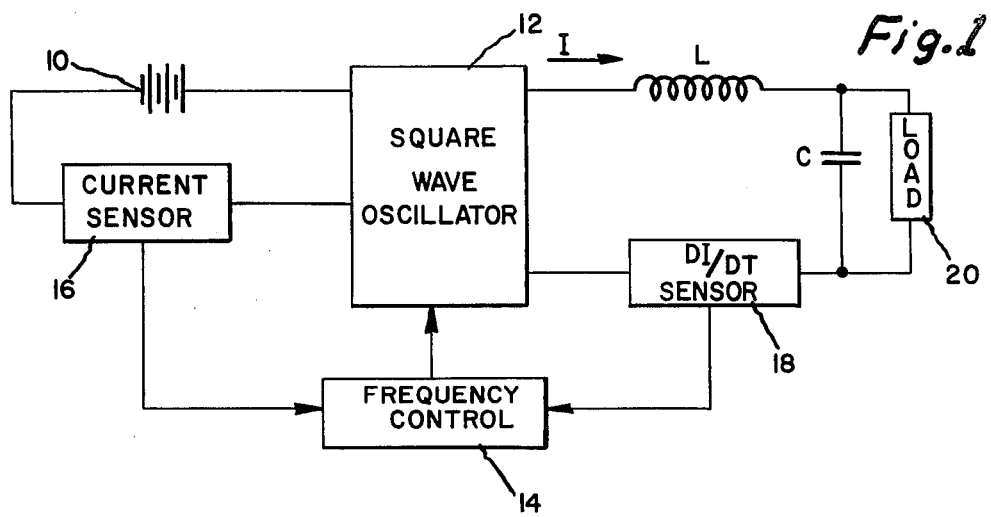
FIG. 1 is a functional block diagram of a circuit of the present invention.

FIG. 1 is a constant power inverter circuit of the present invention. A source of direct current power 10; which may, for example be a battery or a rectifier type power supply, is connected to furnish input power to a variable frequency oscillator 12 having a substantially constant voltage output which may, advantageously, be a square wave. Output power from the oscillator 12 is coupled to a series resonant matching circuit comprising and inductor L and a capacitor C. A load impedance 20 is connected as a damping element in the resonant circuit formed by the inductor L and the capacitor C. Most suitably, the load impedance 20 is connected in parallel with the capacitor C. The frequency of the oscillator 12 is determined by a frequency control circuit 14 in conjunction with a peak current sensor 16 and a current rate-of-change sensor 18. In a preferred embodiment of this circuit, the current sensor 16 may be connected in series with the direct current source 10 and the oscillator 12 input. The current rate of change sensor 18 may be connected in series with the resonant circuit formed by the inductor L and capacitor C. The specific connection topology of the current sensor 16 and the current rate of change sensor 18 are, however, not critical to the operation of the inverter circuit and these components may be of any type and connected in any manner known to the art.

Figure 2B:
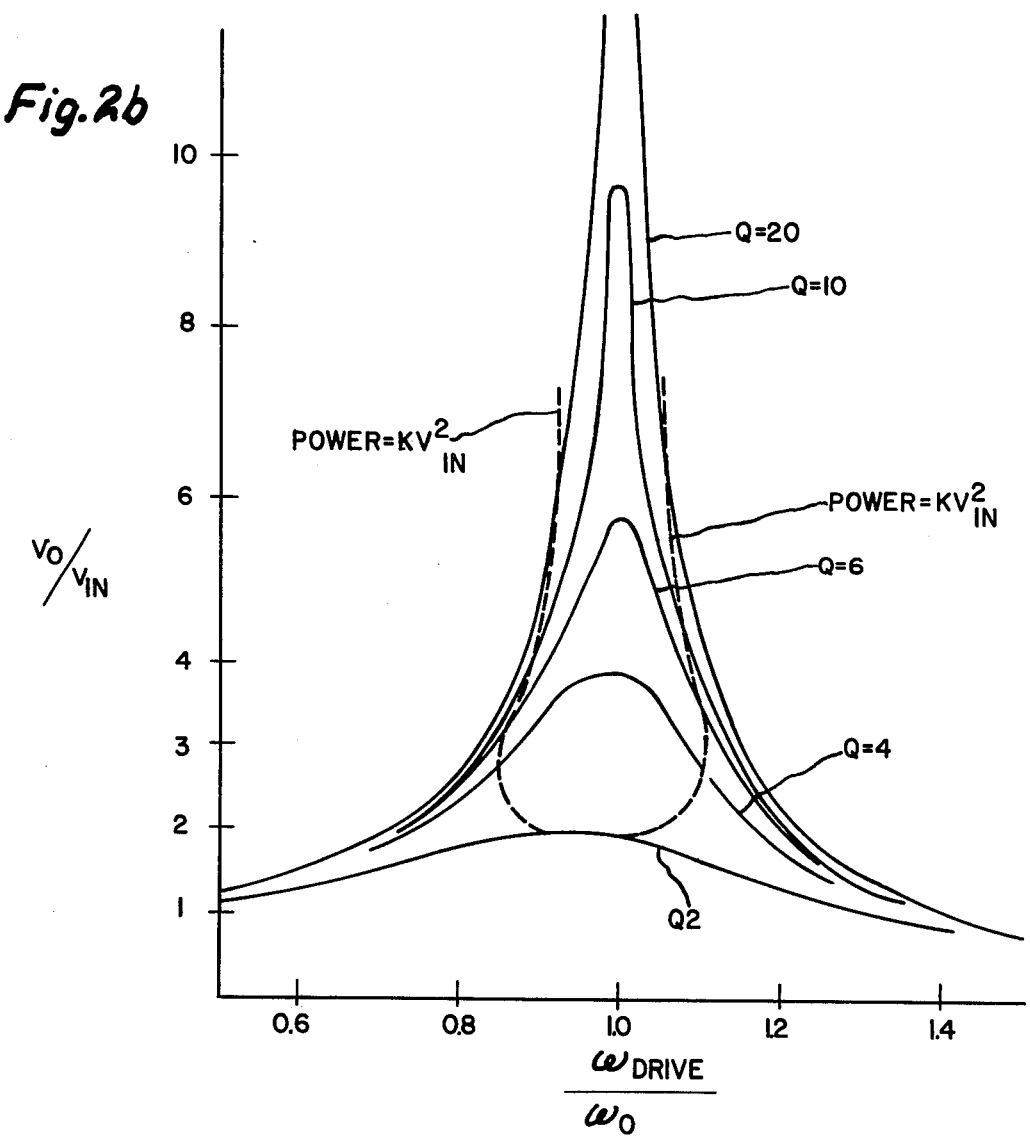
FIGS. 2a, 2b, and 2c illustrate the operation of a resonant power matching network.
Figure 2C:
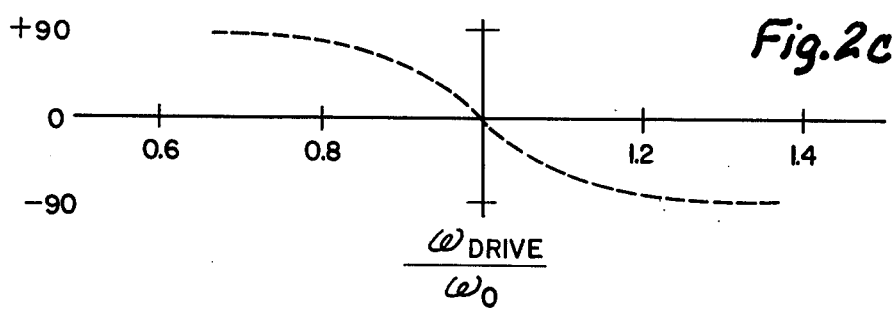
Figure 2A:
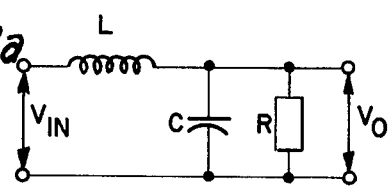

The operation of the resonant matching network is explained with reference to FIG. 2a which illustrates an equivalent circuit having input voltage $V_{in}$, load voltage $V_o$, inductance L, capacitance C, and shunt resistance R. FIG. 2b illustrates the well-known transfer function of this circuit as a function of input frequency (expressed as a fraction of the unloaded circuit resonant frequency $\omega_o$ and the circuit Q).

For a constant voltage drive at the resonant frequency, the load voltage $V_o$ is proportional to the circuit Q.

$$V_o/V_{in} = Q = R/\omega_o L \tag{1}$$

and the load power is $$V_o^2/R = Q^2 V_{in}^2/R = K R^2 V_{in}/R = KRV_{in} \tag{2}$$

where K is a constant.

If the voltage transfer ratio is instead established at a value $$V_o/V_{in} = k\sqrt{R} \tag{3}$$

where k is a constant, then the load power will be constant. The dashed curves of FIG. 2b illustrate two loci of points for which Equation 3 is satisfied.

Substantially constant power can be delivered to the load if the drive voltage $V_{in}$, produced by the square wave oscillator 12 of FIG. 1 is maintained at those frequencies near, but not at resonance, as defined by the dashed curves of FIG. 2b and Equation 3.

Either of the loci defined by FIG. 2b may be utilized for operation of the inverter. It may be seen, however, by reference to FIG. 2c (which is a plot of the phase of current flow into the network of FIG. 2a) that operation at frequencies below resonance presents a leading (capacitive) load to the oscillator while operation above resonance presents a lagging (inductive) load. For the transistorized oscillator embodiments described herein, operation into inductive loads at a frequency above $\omega_o$ is preferred.

The frequency control circuit 14 functions to maintain the operating frequency of the square wave oscillator 12 somewhat above the damped resonant frequency of the circuit formed by the inductor L, the capacitor C, and the load impedance 20 (FIG. 1). The frequency control function is most advantageously accomplished by switching the oscillator 12 to induce commutation of its output voltage at such times as the rate-of-change of current in the resonant circuit, as detected by the sensor 18, is at or near zero; that is to say, the voltage output is switched at each peak of the current wave in the resonant circuit and, thus, by forcing the current to lag the voltage by nearly 90° functions to maintain the oscillator frequency substantially on the constant power curve of FIG. 2b.

The above-described frequency control, which commutates the oscillator as the rate of change of current in the resonant circuit passes substantially through zero, functions to regulate load power over a wide range of load impedance 20 values. The circuit will not, however, effectively control oscillator operation for loads 20 which are unable to accept real power: that is, loads having very high or very low resistive components. For such loads, the oscillator 12 operation may effectively be controlled by a circuit which induces commutation of the output voltage as the instantaneous current flow from the oscillator 12 equals a predetermined reference level. Inverter circuits which operate in this second mode are more particularly described in the above-referenced patent disclosures which are incorporated herein by reference. If the oscillator 12 contains no components which are capable of substantial energy storage, current in the output circuit may be effectively determined by connecting a current sensor 16 in series with the oscillator input power supply 10.

Figure 3:
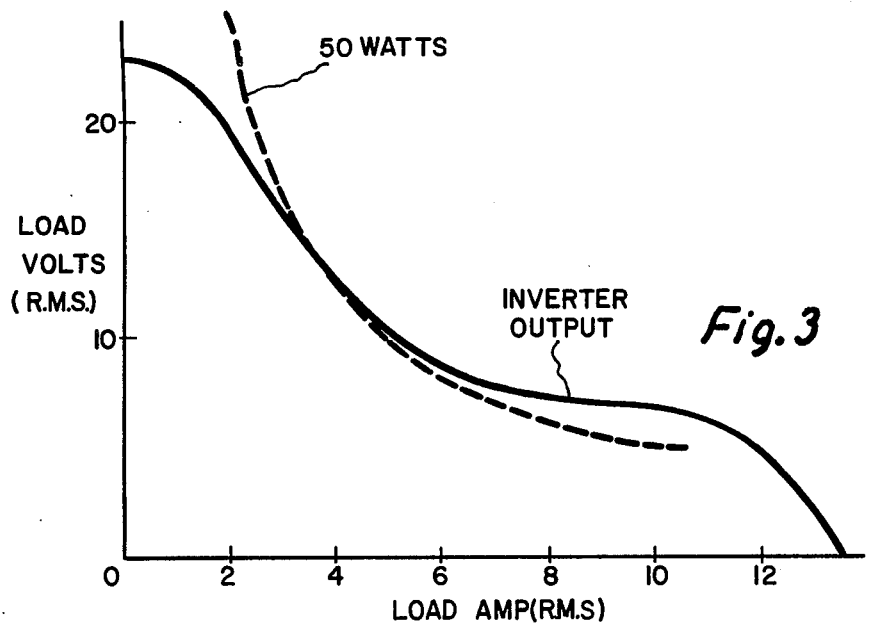
FIG. 3 illustrates the volt-ampere characteristic of a 50-watt inverter of the present invention.

The power regulating capability of the inverter circuits of the present invention is illustrated in FIG. 3 which is a curve of the RMS voltage across the load 20 as a function of RMS current through that load for a 50-watt inverter circuit of the type illustrated in FIG. 1 and more particularly described below. It will be noted that for load currents between approximately 3 amperes and approximately 10 amperes, the inverter output characteristic (solid line) closely approximates a theoretical 50-watt regulated curve (dashed line). Variations between the inverter output curve illustrated and the theoretical 50-watt curve are attributable, for the most part, to losses in magnetic elements incorporated in the particular circuit embodiment utilized for these measurements. Below approximately 1½ amperes and above approximately 11 amperes, the inverter is switched in a peak current limiting mode to insure stable circuit operation.

Figure 4:
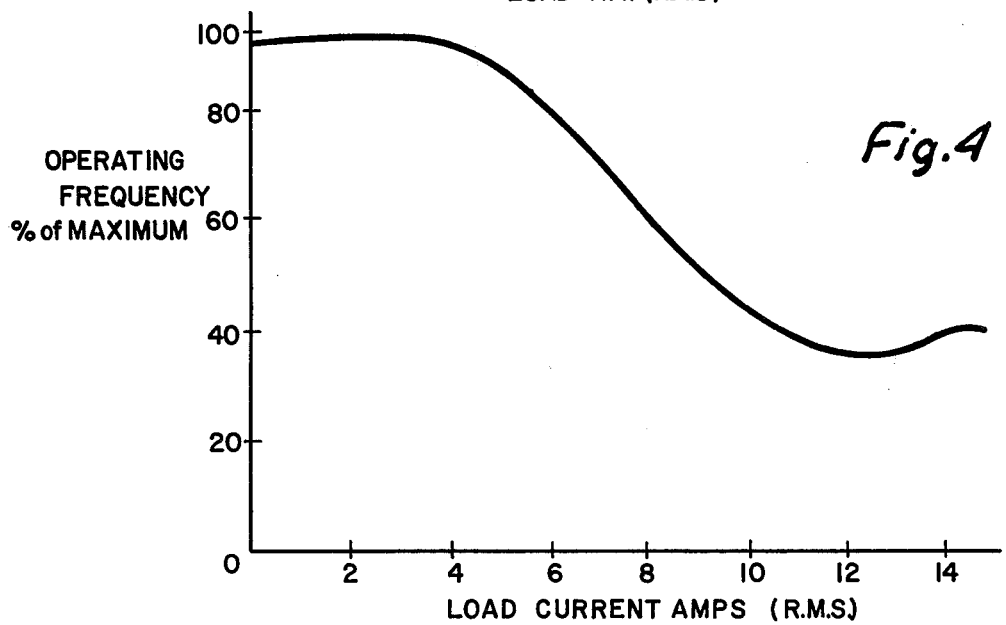
FIG. 4 illustrates the operating frequency vs. load current characteristics for the inverter of FIG. 3.

FIG. 4 is a plot of the operating frequency of the inverter circuit of FIG. 2 as a function of load current. It may be seen that the operating frequency decreases with increasing load current: that is, the operating frequency tends to decrease with decreasing load voltage. This characteristic is compatible with the use of magnetic circuit elements having constant volt-second characteristics, for example transformers and/or inductors with saturating cores.

Figure 5:
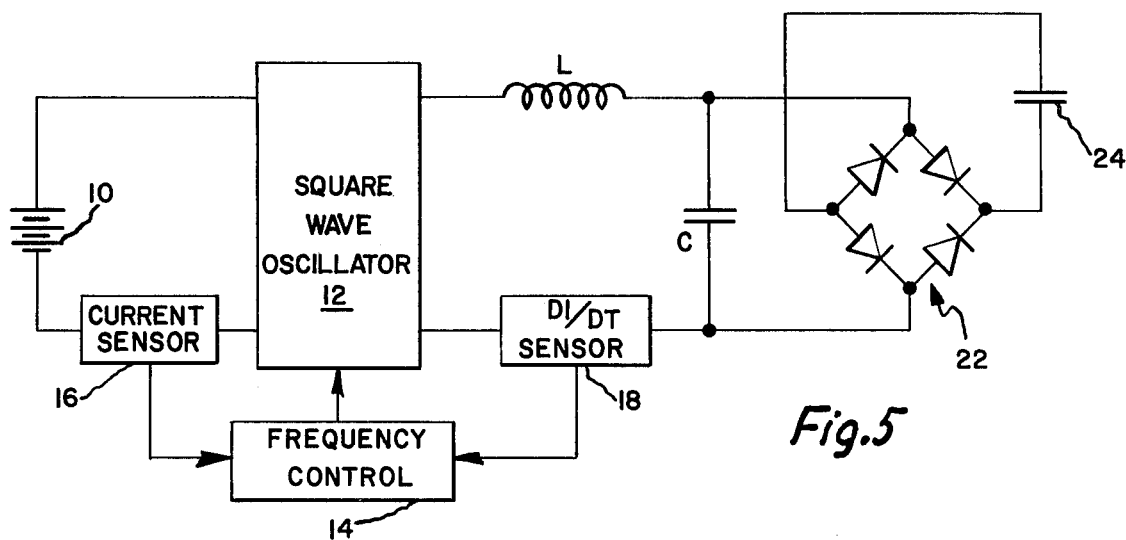
FIG. 5 is an inverter of the present invention connected in a capacitor charging circuit.

FIG. 5 is the inverter of the present invention connected in a capacitor charging circuit. Such circuits are useful, for example for charging pulse capacitors which are utilized in photoflash and pulse modulator apparatus. A rectifier 22 is connected in parallel with the capacitor C of the series resonant circuit. The direct current output from the rectifier 22 is applied to an energy storage capacitor 24. The constant power output characteristic of the inverter allows the capacitor 24 to charge at approximately twice the rate possible with a conventional, constant current charging circuit having the equivalent power rating (the equivalent rating is determined by multiplying the short circuit current by the open circuit voltage of the conventional charging circuit).

Figure 6:
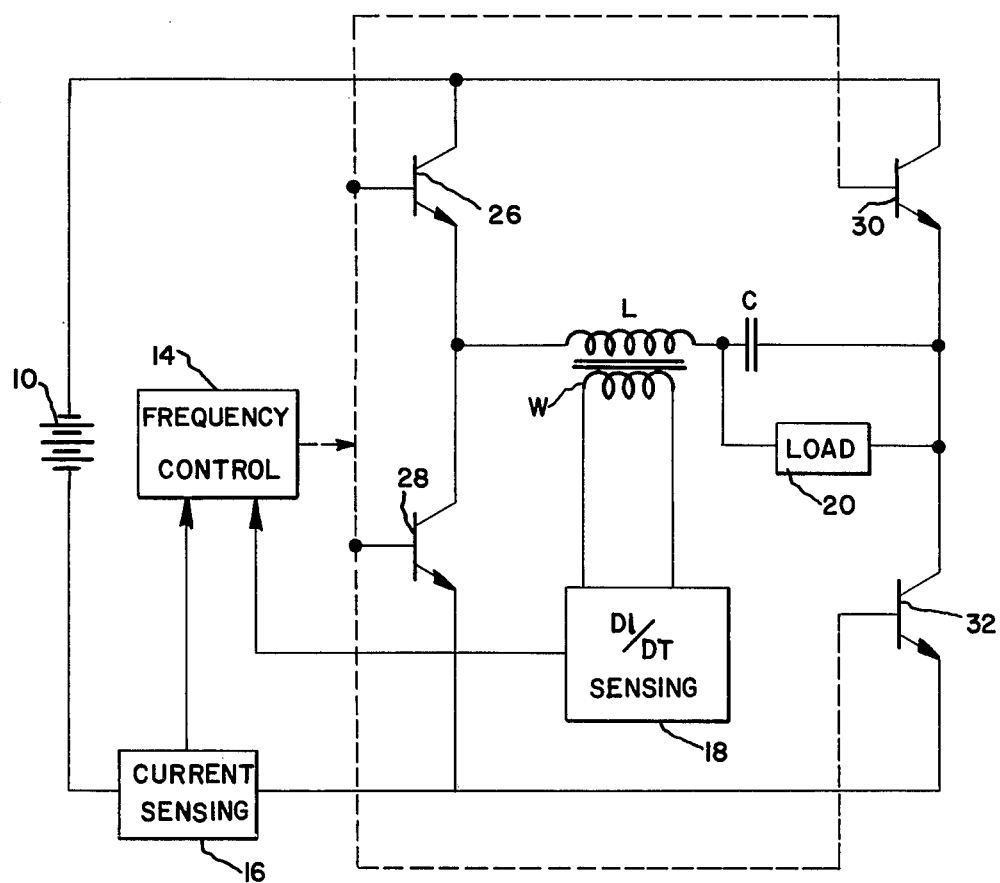
FIG. 6 is an inverter of the present invention which comprises a bridge output stage.

FIG. 6 is an inverter of the present invention having a transistorized bridge output stage. Circuits of this type may be constructed from transistors having a relatively low breakdown voltage rating and are, therefore, suitable for integration in monolithic form. A frequency control 14 provides input signals to four transistors 26, 28, 30, and 32, which are connected in bridge configuration across the direct current power source 10. The frequency control 14 functions to maintain transistors 28 and 30 in conduction at such time as transistors 26 and 32 are cut off and vice versa. Commutation of the output voltage is accomplished by alternately switching conduction between transistors 26 with 32 and 30 with 28. A series resonant circuit formed by an inductor L and capacitor C bridges the transistors and is damped by a load 20 connected in parallel with the capacitor C. Current sensing elements 16 may be connected in series with the DC power source 10. The rate of current change in the load circuit may be detected, for example, with a winding W on the inductor L connected to a sensing circuit 18.

Figure 7:
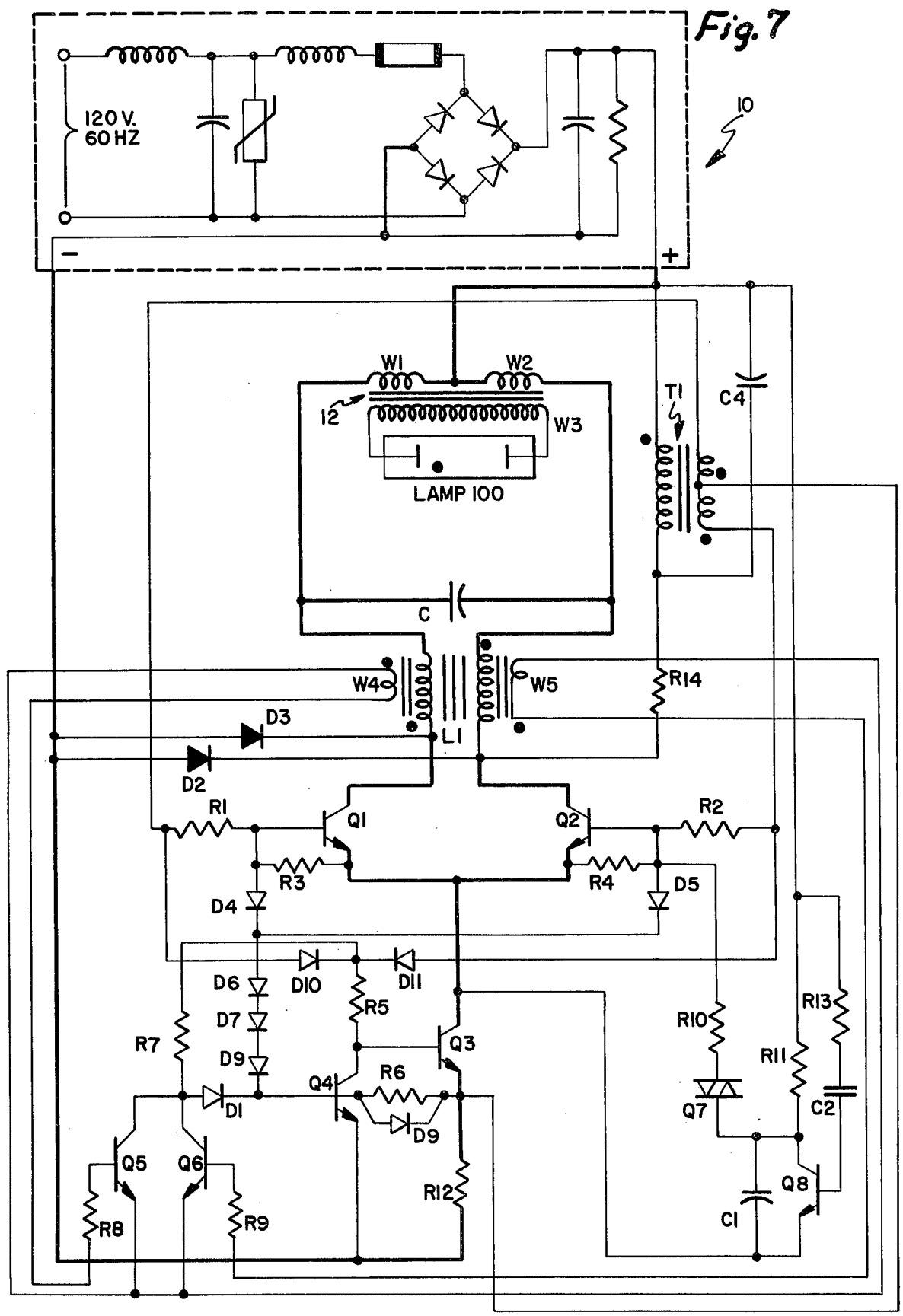
FIG. 7 is a schematic diagram of a preferred embodiment of the present invention with a gas discharge lamp load.

FIG. 7 is a preferred embodiment of an inverter circuit of the present invention which is connected to drive an discharge lamp 100 through a transformer T2. The transformer comprises a center-tapped primary having windings W1 and W2 and a secondary winding connected to the lamp 100. Although the specific circuit embodiment described herein comprises a discharge lamp load, it will function in the manner described with other loads.

The common node of windings W1 and W2 is the center tap of the lamp transformer T2 primary winding and is connected to the positive terminal of a conventional, line operated power supply and filter circuit 10. The primary winding formed by W1 and W2 is connected in parallel with a resonating capacitor C and in series with the main windings of a resonating inductor L1. The inductor L1 comprises two main windings, on a common core with two auxiliary sense windings W4 and W5. The main windings on inductor L1 are driven respectively from the collectors of push-pull switching transistors Q1 and Q2. The emitters of the switching transistors are connected to a common point at the collector of a third switching transistor Q3. The emitter of transistor of Q3 returns through a current sensing resistor R12 to the negative terminal of the power supply 10. The transistors Q1 and Q2 alternately conduct to impress a substantially square wave AC voltage on the load circuit formed by the inductor L1, the capacitor C, and the lamp 100. The emitter switch transistor Q3 functions, to force the conducting transistor Q1 or Q2 off and the non-conducting transistor on, initiating commutation of the output voltage. Thus, the inverter is switched by turning the emitter switch transistor Q3 off. Transistor Q4 functions to turn transistor Q3 off by shorting its base to ground. The combination of transistor Q4, current sensing resistor R12, and resistor R6 form the peak current control. If current flowing through resistor R12 produces a voltage drop greater than the emitter base drop of transistor Q4, current flows through resistor R6 turning Q4 on and Q3 off.

The zero rate-of-current-change detector consists of transistors Q5 and Q6, resistors R7, R8, and R9, diode D1, and the windings W4 and W5 on the inductor L1. If voltage drop across the inductor L1 is positive at the dot, transistor Q6 is held in saturation by base current flow through resistor R9 and winding W5. Whenever voltage across the inductor L1 is negative at the dot, transistor Q5 is held in saturation by base current through resistor R8 and winding W4. If either Q5 or Q6 is saturated, the current through resistor R7 is shunted to ground. If voltage across L1 is near zero, the voltage on windings W4 and W5 is less than the emitter-base drop of transistors Q5 and Q6 so that neither Q5 nor Q6 is conducting and current through resistor R7 passes through diode D1 to the base of Q4. This condition occurs only when the rate-of-change of current, dI/dt, through the inductor L1 is substantially zero. At such times, Q4 will be turned on turning off Q3 and commutating the inverter output voltage.

Square wave drive signals for the bases of transistors Q1 and Q2 are provided by transformer T1 through resistors R1 and R2. Resistors R10 and R11, capacitor C1 and trigger diode Q7 provide pulses to the base of Q2 to assure oscillator starting. Transistor Q8 in conjunction with resistor R13 and capacitor C2 provide a short delay upon initial turn-on to prevent possible damage from voltage transients.

Power diodes D2 and D3 function to conduct inductive currents to ground after the switching transistors commutate. Diodes D4–D9 direct currents which tend to flow out of the bases of transistor Q1 and Q2 (following turn-off of Q3) into the base of Q4 to provide positive feedback and assure that Q3 remains off. Diodes D10 and D11 provide a power supply for the control circuit.

In accordance with the above-referenced disclosure Ser. No. 662,523, an inverter having peak current commutation control circuits of the type exemplified by transistors Q3 and Q4 of FIG. 7 will function to seek and operate at the resonant frequency of a high Q series resonant LC circuit having an unignited, cold gas discharge lamp connected as a damping element on the capacitor. After ignition of the lamp that circuit will also function to limit the peak current supplied to the lamp and thus provide a ballasting function.

The circuit of disclosure Ser. No. 662,523 does not, however, provide positive control of the inverter frequency for values of load impedance intermediate between those of an unignited, cold lamp and a hot, running lamp. If such a circuit is utilized to restart a hot discharge lamp, it may fail to lock on the resonant frequency of the matching circuit which, due to loading effect of the hot lamp, has a relatively low Q.

The inverter circuit of the present invention serves to define inverter operation for all values of load impedance encountered in discharge lamp auxiliary service. The inverter of FIG. 7 will, therefore, seek and operate near the resonant frequency of the lamp circuit to provide the maximum voltage input available for restarting hot discharge lamps and will serve to regulate and stabilize the power input to discharge lamps under all operating conditions.

The circuits of the present invention provide inverters having constant power outputs for loads of varying impedance. Such inverter circuits allow fast, economical, capacitor charging in pulse applications, and efficient operation of gas discharge lamps.

While the invention has been described in detail hwerein in accord with certain embodiments thereof, many modifications and changes therein may be effected by those skilled in the art. Accordingly, it is intended by the appended claims to cover all such modifications and changes as fall within the true spirit and scope of the invention.

The invention claimed is:

1. A constant power electrical source comprising in combination:

power supply means connected to furnish a variable frequency electric power output at substantially constant voltage;

an output circuit including a first capacitor and an inductor connected in series with said power output to form a resonant circuit and a load impedance connected in parallel with said first capacitor; and means which function to automatically adjust the frequency of said power supply means, in reponse to changes of the value of said load impedance, to an operating frequency, near but not at the resonant frequency of said output circuit, whereat the voltage transfer function of said output circuit is substantially equal to a constant multiplied by the square root of the equivalent shunt resistance of said output circuit.

2. The power source of claim 1 further including means for commutating the polarity of the voltage of said power output at such times as the instantaneous current flow from said power supply means equals a predetermined reference current level.

3. The power source of claim 1 wherein the means for adjusting frequency includes means for commutating the polarity of the voltage of said electrical power output at such times as the time derivative of current flow in said inductor is zero.

4. The power source of claim 3 further including means for commutating the voltage of said electrical power output at such times as the instantaneous current flow from said power supply means equals a predetermined reference current level.

5. The power source of claim 4 wherein said load impedance comprises a rectifier circuit.

6. The power source of claim 5 wherein said rectifier circuit is connected to charge a second capacitor.

7. The power source of claim 4 wherein said power supply means is a solid state inverter.

8. The power source of claim 7 wherein said inverter comprises a transistorized bridge switching circuit connected to receive input signals from said frequency adjusting means and to provide said electrical power output to said inductor, said first capacitor, and said load.

9. The power source of claim 7 wherein said inverter comprises push-pull switching elements.

10. The power source of claim 9 wherein said means for commutating said voltage is an emitter switch transistor connected in series with said push-pull switching elements.

11. A constant power electrical source comprising, in combination;

power supply means including a solid state inverter connected to furnish a variable frequency electrical power output at substantially constant voltage;

an output circuit including a first capacitor and an inductor connected in series with said power output to form a resonant circuit and a load impedance connected in parallel with said first capacitor; and means for adjusting the frequency of said power supply means to an operating frequency near, but not at, the resonant frequency of said output circuit; said means for adjusting the frequency including:

means for commutating the polarity of the voltage of said electrical power output at such times as the voltage drop across said inductor is zero and means for commutating said polarity at such times as the current flow from said power supply means equals a predetermined reference current level.

12. The power source of claim 1 wherein said means for commutating the polarity at such times as the voltage drop across said inductor is zero comprises one or more auxiliary windings on said inductor and means for sensing a voltage drop on one or more of said auxiliary windings.

13. The power source of claim 11 wherein said inverter comprises a bridge output stage.

14. The power source of claim 11 wherein said solid state inverter comprises push-pull switching elements.

15. The power source of claim 11 wherein said inverter further comprises a common switching element connected to interrupt current flow through said push-pull switching elements whereby a commutation of polarity is initiated.

16. The power source of claim 15 wherein said push-pull switching elements are push-pull transistors, said common switching element is an emitter switch transistor connected in series with the emitters of said push-pull transistors and said means for adjusting the frequency of the power supply means is a circuit connected to turn off said emitter switch transistor at such times as the time derivative of current flow through said inductor equals zero.

17. The source of claim 6 further including circuit means connected to turn off said emitter switch transistor at such time as current flow through said emitter switch transistor equals a predetermined reference level.

18. A constant power electrical source comprising, in combination;

power supply means including a solid state inverter connected to furnish a variable frequency electric power output at substantially constant voltage;

an output circuit including a first capacitor and an inductor connected in series with said power output to form a resonant circuit and a load-impedance connected in parallel with said first capacitor; and means for adjusting the frequency of said power supply means to an operating frequency near but not at the resonant frequency of said output circuit wherein said operating frequency is substantially defined by the locus of points whereat the voltage transfer function of said output circuit is a constant multiplied by the square root of the equivalent shunt resistance of said load impedance.

19. The power source of claim 18 wherein said operating frequency is greater than said resonant frequency.

20. The power source of claim 18 wherein said inverter comprises a bridge output stage.

21. The power source of claim 18 wherein said inverter comprises push-pull switching elements.

22. The power source of claim 21 wherein said push-pull switching elements comprise push-pull switching transistors;

an emitter switch transistor is connected in series between said push pull switching transistors and a source of DC power; and wherein said means for adjusting the frequency includes means for interrupting current flow through said emitter switch transistor whereby a commutation of polarity is initiated.

23. An improved inverter of the type comprising solid state switching elements for producing alternating voltage across a load impedance and means for commutating said alternating voltage at such time as current flow through said load impedance equals a predetermined reference level wherein, as an improvement, said inverter circuit further comprises:

means for commutating said voltage at such times as the rate-of-change of current flow through said load impedance equals zero.

24. The inverter of claim 23 wherein said switching elements comprise push-pull transistors.

25. The inverter of claim 23 wherein said load impedance comprises:
 a power utilizing element;
 an inductor connected in series with said power utilizing element; and
 a capacitor connected in parallel with said power utilizing element.

26. A method for supplying a regulated electrical power level to a variable load comprising the steps of:
 connecting said load as the damping element in a resonant circuit;
 driving said resonant circuit with a substantially constant voltage AC wave; and
 adjusting the frequency of said AC wave in response to variations of said load to maintain said frequency at a value near the natural frequency of said damped resonant circuit; whereat the voltage transfer function of said damped resonant circuit is substantially proportional to the square root of the equivalent shunt resistance of said load.

27. The method of claim 26 wherein said frequency of said AC wave is greater than said damped resonant frequency.

28. The method of claim 26 wherein said step of adjusting the frequency comprises commutating the polarity of the voltage of said AC wave at such times as the rate of change of current flow of said AC wave in zero.

29. The method of claim 27 wherein said step of adjusting the frequency further comprises commutating the polarity of the voltage of said AC wave at such times as the instantaneous current flow of said AC wave equals a predetermined reference current level.

* * * * *